Oct. 29, 1957     C. C. BAUERLEIN     2,811,286
LIQUID MEASURING AND DISPENSING DEVICE
Filed April 19, 1956     2 Sheets-Sheet 1
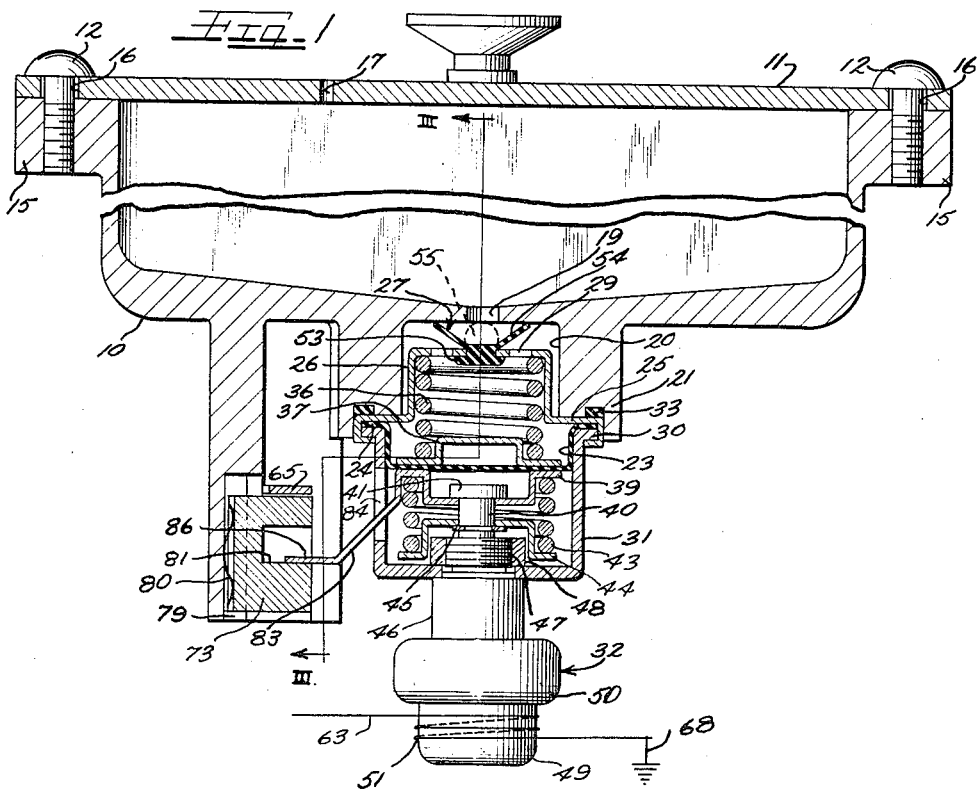
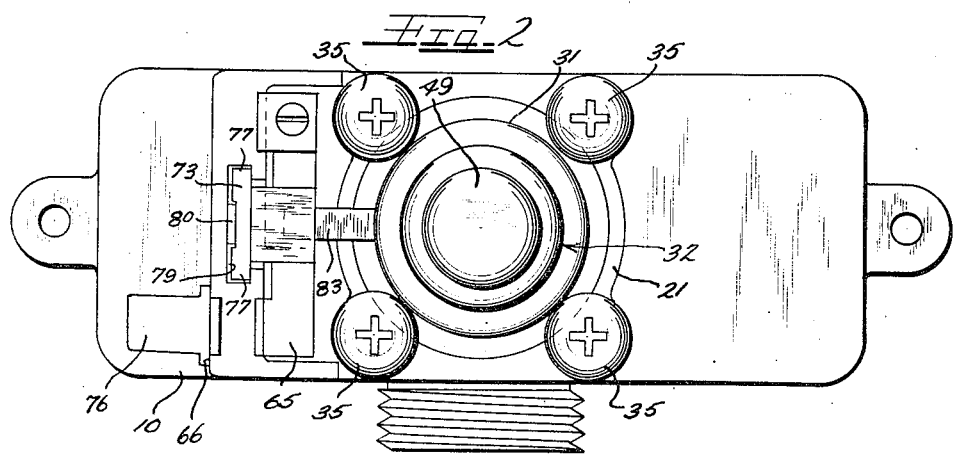
Inventor
CARL C. BAUERLEIN

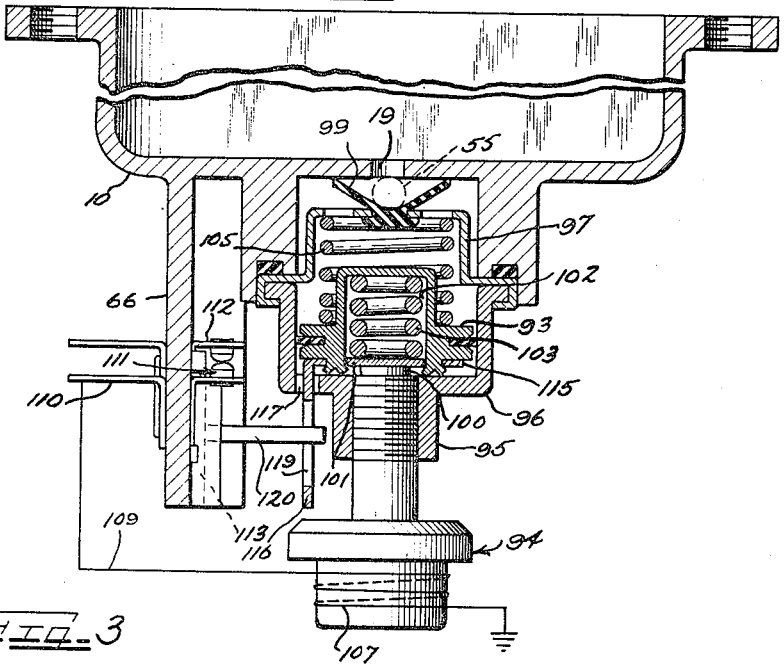
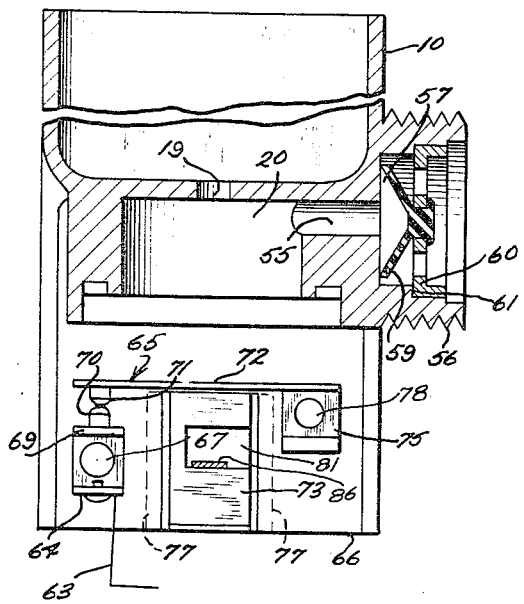
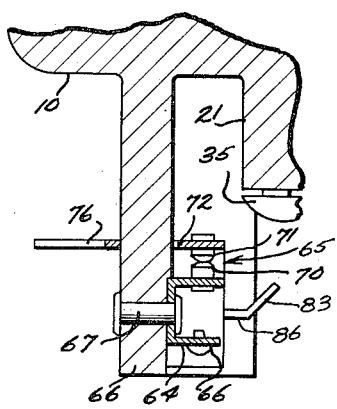

United States Patent Office 2,811,286
Patented Oct. 29, 1957

2,811,286

LIQUID MEASURING AND DISPENSING DEVICE

Carl C. Bauerlein, Lincolnwood, Ill., assignor to The Dole Valve Company, Chicago, Ill., a corporation of Illinois Application April 19, 1956, Serial No. 579,221

13 Claims. (Cl. 222—212)

This invention relates to improvements in liquid measuring and dispensing devices.

A principal object of the invention is to provide a novel and improved measuring device for measuring and dispensing a measured volume of liquid, in which measuring is effected by operation of an electrically energizable heat motor.

A further object of the invention is to provide a measuring device for measuring and dispensing a measured volume of liquid in which measuring is attained by the extensible movement of the power member of a heat motor, electrically heated and accommodated to cool at the termination of a measuring operation.

A further object of the invention is to provide a simple and improved form of measuring device having a varying volume measuring chamber in which the volume of the chamber is reduced by operation of an electrically heated heat motor to dispense a predetermined volume of liquid, and in which liquid is drawn in to the chamber by spring means, increasing the volume of the chamber and returning the power member of the heat motor.

Still another object of the invention is to provide a measuring device having a varying volume measuring chamber having a movable wall varying the volume of the chamber, in which a spring serves to move the wall in a direction to increase the volume of the chamber and draw liquid thereinto, in which the extensible power member of a thermal element serves to move the wall in a direction to decrease the volume of the chamber and force a measured volume of liquid from the chamber, and having electrically energizable heating means for electrically heating the thermal element to effect the delivery of a measured volume of liquid from the chamber, with a switch operated by movement of the power member of the thermal element to deenergize the heating means for the thermal element.

These and other objects of the invention will appear from time to time as the following specification proceeds and with reference to the accompanying drawing wherein:

Figure 1 is a vertical sectional view taken through a dispenser constructed in accordance with the invention;

Figure 2 is a bottom plan view of the dispenser shown in Figure 1;

Figure 3 is a partial fragmentary sectional view taken substantially along line III—III of Figure 1 with the cover, thermal element and measuring diaphragm removed;

Figure 4 is an enlarged fragmentary detail view with parts in section to show certain details of the switch not shown in Figure 3;

Figure 5 is a view somewhat similar to Figure 1, but illustrating a modified form in which my invention may be embodied.

In the embodiment of the invention illustrated in the drawings, I have shown a container 10 for liquid to be measured, having a top cover 11 retained in place by machine screws 12 threaded within flanged portions 15 of said container and extending through slots 16 in said cover, to accommodate ready removal of said cover, to fill the container when required. The cover 11 has an air hole 17 to accommodate the drawing of liquid from the bottom of said container through a passageway 19 forming an inlet to a measuring chamber 20. The measuring chamber 20 is formed by a depending wall 21 extending about the passageway 19 and closed at its bottom by a flexible diaphragm 23, movable with respect to said wall to vary the volume of said chamber.

The diaphragm 23 has a marginal portion 24 abutting a flange 25 of a cage 26, extending within the chamber 20 along the wall thereof and forming a carrier for a check valve 27, carried in an apertured top wall 29 for said cage.

The opposite side of the marginal portion 24 of the diaphragm 23 from the flange 25 is abutted by a flange 30 of a retainer 31 for a heat motor in the form of a thermal element 32. The marginal portion 24 of the diaphragm is sealed to the flanged portion 25 of the cage 29 and the flanged portion 30 of the retainer 31 by spinning the edge of the flanged portion 25 over the flange 30, and retaining the flange 30 into engagement with the marginal portion 24 of the diaphragm 23 and with the flange 25, to provide a leak proof joint therebetween. The flange 25 is sealed to the bottom portion of the annular wall 21 as by an annular seal 33 recessed within the end of said wall. Machine screws 35, threaded in the bottom end of the annular wall 21 are provided to retain the cage 26 in sealing engagement with the lower end portion of the wall 21.

A return spring 36 is seated at one end within the cage 26 and at its opposite end on a diaphragm plate 37, engaging the top or inner side of the diaphragm 23. The opposite side of the diaphragm 23 from the diaphragm plate 37 is engaged by a diaphragm plate 39 carried on a power member 40 for the thermal element 32, underneath a head 41 of said power member. An overtravel spring 43 is seated on the underside of the diaphragm plate 39 at one end and on a flanged carrier 44 at its opposite end. The flanged carrier 44 abuts a snap washer 45, snapped to the power member 40, and serves to move the diaphragm plate 39 toward the chamber 20 through the overtravel spring 43 upon extensible movement of the power member 40, as the thermal element 32 is heated, to extend the diaphragm 23 within the chamber 20. The return spring 36 serves to retractibly move the power member 40 upon cooling of the thermal element 32, and to move the diaphragm 23 outwardly of the chamber 20 to increase the volume thereof and draw liquid from the container 10 through the inlet 19 and past the check valve 27 into the chamber 20, as the thermal element 32 cools.

The thermal element 32 is shown as being a so-called power or wax type of thermal element having a cylinder 46 from which the power member 40 extensibly moves upon heating of said thermal element. As herein shown, the cylinder 46 has a reduced diameter threaded upper end portion 47 extending through the bottom of the retainer 31, and retained to said retainer as by a nut 48 threaded on said cylinder into engagement with a bottom of said retainer. The thermal element 32 also has a casing 49 beneath the cylinder 46 and containing a thermally expansible fusible material. A clamping ring 50 is shown as surrounding the casing 49 adjacent the cylinder 46 for clamping the cylinder 46 to the casing 49. An electric heater 51, which may be a resistor heater, encircles the casing 49 for heating said casing and the thermally expansible material contained therein, to effect extensible movement of the power member 40 as the heater 51 is electrically energized. It should here be understood that while the heater 51 is shown as encircling the casing 49, that it may be within said casing, if desired.

The thermal element 32 may be of the same general type as shown and described in the Vernet Patent No. 2,368,181, dated January 30, 1945, so need not herein be shown or described in detail. In such thermal elements, the thermally expansible material contained within the casing 49 expands as it reaches its fusion point and acts against a membrane or deformable member (not shown), to extend the power member 40 from the cylinder 46 upon predetermined rises in temperature.

The check valve 27 may be made from rubber, an elastomer or one of the various other substitutes for rubber, and has a depending button 53 extending through an aperture of the apertured top 29 of the cage 26 and is secured to said cage by engagement of said button underneath the top of said cage. Extending from the button 53 toward the container 10 or top of the chamber 20 is a thin generally frusto-conical wall 54 of the check valve, engaging at its rim the top of the chamber 20 upon extensible movement of the power member 40 and movement of the diaphragm 23 within the chamber 20 in a direction to displace fluid therefrom. The rim of the wall 54 moves away from the top of the chamber 20 upon movement of the diaphragm 23 in a direction to draw liquid into said chamber through the inlet 19.

The chamber 20 has an outlet passageway 55 leading through the wall 21 thereof and having communication with the hollow interior of a threaded boss 56, the hollow interior of which forms an outlet from the chamber 20. The threaded boss 56 and outlet from the chamber 20 may be connected to a receptacle (not shown) for periodically supply the receptacle with a measured volume of liquid, dispensed by movement of the diaphragm 23 inwardly of the chamber 20.

The hollow interior portion of the threaded boss 56 is shown as having a relatively wide shoulder 57 therein, abutted by the edge or rim of a flexible check valve 59, like the check valve 27, and carried in an apertured cage 60, which may be pressed within the hollow interior portion of the boss 56 into engagement with a shouldered portion 61 thereof. The check valve 59 is arranged to accommodate the passage of a measured volume of fluid through the passageway 55 and out through the passageway formed by the hollow interior of the boss 56, but to prevent the drawing of fluid within the chamber 20, as the diaphragm 23 is moved to draw liquid within said chamber through the inlet 19.

The resistor heater 51 for the thermal element 32 is energized by a conductor 63 connected to a terminal 64 of a switch 65, when the switch is closed, and a conductor 68 herein shown as being connected to ground.

The terminal 64 is shown in Figures 3 and 4 as being on one leg of a generally U-shaped piece of conducting material secured to the inner face of a depending leg 66 of the container 10, as by a rivet 67. Another leg 69 is shown as having a stationary contact 70 carried thereon, and extending upwardly therefrom for engagement with a movable contact 71 on the end of movable switch arm 72. The movable switch arm 72 may be a resilient arm, and extends across the leg 66 over an operating member 73 therefor and has a depending right angled portion 75 abutting the leg 66. A terminal 76 extends outwardly from the leg 66 and is riveted thereto as by a rivet 78.

The switch arm 72 is shown as being flexed upwardly to disengage the contact 71 from the contact 70 by vertical movement of the operating member 73, effected by extensible movement of the power member 40 of the thermal element 32 from its cylinder 46.

The operating member 73 is shown as having gibs 77 extending from opposite sides thereof and slidably guided within a gibbed guide 79 formed within the leg 66 and extending vertically therealong. A leaf spring 80 is shown as abutting the rear wall of the guide 79 and the inner wall of the operating member 73, for maintaining said operating member into slidable engagement with gibbed guide 79. The operating member 73 also has a slot 81 opening toward the retainer 31 and engaged by a leg 83 of the diaphragm plate 39. As herein shown the leg 83 extends from the edge of the diaphragm plate 39 in a downward direction and an outwardly inclined direction through a slot 84 formed in the wall of the retainer 31, and has a generally horizontal engaging portion 86, engaging the bottom of the notch or slot 81 when the thermal element 40 is in retracted relation with respect to the cylinder 46.

The contacts 70 and 71 being engaged, the casing 49 of the thermal element 32 will be heated by energization of the resistor heater 51 through the movable switch arm 72, contacts 70 and 71 of the switch 65 and the conductors 63 and 68. This will effect extensible movement of the power member 40 with respect to the cylinder 46 and a reduction in the volumetric capacity of the chamber 20 resulting in the forcing of liqiud in said chamber through the outlet passageway 55. Upon a predetermined travel of the power member 40, the engaging end portion 86 of the leg 83 will come into engagement with the upper side of the notch 81. Further extensible movement of the power member 40 will then engage the operating member 73 with the resilient switch arm 72 and operate said switch arm to open the circuit between the contacts 71 and 70. This will deenergize the resistor heater 51 and allow the thermal element 32 to cool. The spacing between the diaphragm plate 37 and the flange 25 is such that the switch 65 will be opened as the diaphragm plate 37 contacts the flange 25, and any overtravel of the power member 40 will be taken up by the overtravel spring 43. Movement of the diaphragm 23 inwardly of the chamber 20 will then stop. A measured volume of liquid will then have been displaced from said chamber through the outlet passageway 55. The spring 36 will then return the power member 40 and diaphragm 23 as the thermal element 32 cools, effecting the drawing of a measured volume of liquid into the chamber 20.

A lost motion connection is thus provided between the engaging end portion 86 of the lug 83 and the operating member 73, to operate said operating member to open the switch 65 as the power member extensibly travels a predetermined distance, to deenergize the heating element for the thermal element, and limit of movement of the diaphragm 23 inwardly of the chamber 20 is reached to determine the volume of liquid displaced from said chamber.

In a modified form of the invention shown in Figure 5, a piston 93 has been substituted for the diaphragm 23. The same part numbers will be applied to certain parts of this figure as were applied to similar parts in Figures 1 through 4. In this form of the invention a thermal element 94 is threaded in a boss 95 depending from a retainer 96 having a cage 97 for a check valve 99 secured thereto as in the form of the invention shown in Figures 1 through 4, and maintaining the cage 97 within the chamber 20 as in the manner illustrated in Figure 1.

The thermal element 94 has an extensible power member 100 abutting a disk 101 within a hollow interior portion 102 of the piston 93. An overtravel spring 103 is interposed between the disk 101 and the end of the hollow interior portion 102 of the piston 93. A return spring 105 is interposed between the end of the cage 97 and the piston 93 to return said piston and the power member 100 upon reductions in temperature.

The thermal element 94 is encircled by a resistor heater 107 energized through a conductor 109 connected with a terminal 110 of a switch 111. The switch 111 is similar to the switch 65 and has a resilient movable switch arm 112 operated by an operating member 113 guided for vertical movement along the leg 66, for opening the contacts of the switch 111 upon upward travel of the piston 93 a predetermined distance.

As herein shown, a ring 115 is secured to the bottom of the piston 93 and has an arm 116 depending therefrom through a slot 117 in the bottom of the retainer 96. The depending arm 116 has a slot 119 extending therealong within which extends an arm 120 of the operating member 113. During extensible movement of the power member 100, upon energization of the resistor heater 107 and engagement of the lower end of the slot 119 with the arm 120, and continued extensible movement of the power member 100, the operating member 113 will open the contacts of the switch 111 as previously described in the form of my invention illustrated in Figures 1 through 4, to deenergize the resistor heater 107 and allow the thermal element 94 to cool. The switch 111 will be opened as the piston 93 contacts the cage 97, and any overtravel of the power member 100 will be taken up by the overtravel spring 103. When the piston 93 contacts the cage 97, a predetermined volume of liquid will have been dispensed through the outlet 55. Upon the cooling of the thermal element 94 the spring 105 will retractibly move the power member 100 and move the piston 93 in a direction to draw in a measured volume of liquid into the chamber 20 through the inlet 19.

It may be seen from the foregoing that I have provided a simple form of measuring and dispensing device in which dispensing of a predetermined volume of liquid is effected by energization of the electrical heating means for a heat motor to displace liquid from a measuring chamber, and in which a switch operated by the heat motor may be provided, if desired, to deenergize the electrical heating means.

It may further be seen that the measuring device is extremely simple both in construction and operation and is particularly suitable for measuring and dispensing liquid detergent for washing machines and the like, but which may efficiently dispense and measure various forms of liquids desired where simplicity in construction and uniformity in the volume of liquid dispensed during each dispensing operation is required.

It will be understood that modifications and variations of the present invention may be effected without departing from the spirit and scope of the novel concepts thereof.

I claim as my invention:

1. In a measuring and dispensing device for measuring and dispensing liquids and the like, a chamber having a movable wall for varying the volume thereof, an inlet into said chamber and an outlet from said chamber, check valves in association with said inlet and said outlet preventing the passage of liquid out through said inlet and into said chamber through said outlet, a thermal element having an operating member extensibly movable along said chamber and moving said wall along said chamber in a direction to displace a measured volume of liquid from said chamber through said outlet, spring means for returning said operating member and moving said wall in a direction to increase the volume of said chamber and draw liquid into said chamber through said inlet, and electrically energizable heating means for said thermal element energizable to heat the same in accordance with the travel of said operating member required to displace a predetermined volume of liquid from said chamber.

2. In a device for measuring and dispensing liquids and the like, a chamber having a movable wall for varying the volume thereof, an inlet into said chamber, an outlet from said chamber, check valves associated with said inlet and said outlet and preventing the expelling of liquid from said chamber through said inlet and the drawing of liquid into said chamber through said outlet, a thermal element on the outside of said chamber and having an operating member extensible along said chamber for moving said movable wall along said chamber in a direction to restrict the volume thereof, electrically energizable heating means for heating said thermal element to effect operation of said operating member, spring means for returning said operating member and moving said movable wall in a direction to increase the volume of said chamber, means for energizing said heating means to heat said thermal element including a switch, and a lost motion connection between said operating member and said switch for operating said switch to deenergize said heating means upon a predetermined travel of said operating member and the displacement of a measured volume of liquid from said chamber.

3. In a measuring and dispensing device for liquids and the like, a variable volume chamber having a movable wall, an inlet into said chamber, an outlet from said chamber, check valves associated with said inlet and said outlet to prevent the passage of liquid out through said inlet and in through said outlet, a thermal element mounted on the outside of said chamber and having an operating member operatively connected with said wall and extensibly movable along said chamber upon increases in temperature, to restrict the volume of said chamber and displace a measured volume of liquid through said outlet, spring means having engagement with said movable wall for returning said operating member and increasing the volume of said chamber upon certain reductions in temperature of said thermal element, electrically energizable heating means for said thermal element, energizable to heat the same and effect extensible movement of said operating member and the displacement of liquid from said chamber through said outlet in accordance with the travel of said operating member, and means deenergizing said heating means in accordance with a measured delivery volume of liquid through said outlet comprising a switch having stationary and movable contacts, an actuator for said movable contact movable to disengage said contacts and deenergize said heating means and accommodate said thermal element to cool, and an arm connecting said operating member with said actuator for operating the same, the connection between said arm and actuator being a lost motion connection and accommodating a predetermined length of travel of said operating member prior to cooling of said thermal element.

4. A liquid measuring and dispensing device comprising a container for liquid having a passage leading therefrom, a measuring chamber in fluid communication with said passage, a diaphragm sealed to an end of said chamber and forming a movable wall for said chamber for varying the volume thereof, a check valve accommodating the passage of fluid from said passageway into said chamber and preventing the back flow of fluid into said container, a spring within said chamber having engagement with said diaphragm to move said diaphragm along said chamber in a direction to increase the volume thereof, means moving said diaphragm in a direction to restrict the volume of said chamber comprising a thermal element mounted on the outside of said chamber and having an extensible power member having operative connection with said diaphragm, for moving said diaphragm in a direction to displace liquid from said chamber upon heating of said thermal element, and electrically energizable heating means for heating said thermal element a period sufficient to effect extensible movement of said power member to displace a measured volume of liquid from said chamber.

5. A liquid measuring and dispensing device comprising a container for liquid having a passage leading from the bottom thereof and having a measuring chamber on the downstream side of said passage in communication therewith, a diaphragm sealed to said measuring chamber and forming a movable end wall therefor, a check valve accommodating the passage of liquid into said chamber through said passageway and blocking the back flow of liquid from said passageway to said chamber, a spring seated within said chamber and having operative engagement with said diaphragm, an outlet from said chamber, a check valve in association with said outlet to accommodate the displacement of liquid through said outlet and prevent the back flow of liquid within said chamber, a thermal element on the outside of said chamber having a power member extensible upon increases in temperature for moving said diaphragm against said spring to displace liquid from said chamber, electrically energizable heating means for heating said thermal element to effect the displacement of liquid from said chamber, and means for deenergizing said heating means in accordance with a predetermined travel of said power member and the displacement of a measured volume of liquid from said chamber, comprising a switch connected in the electrical energizing circuit for said heating means and a lost motion connection between the said power member and switch for opening the contacts of said switch to accommodate cooling of said thermal element.

6. A liquid measuring and dispensing device comprising a measuring chamber, an inlet into said chamber, an outlet from said chamber, check valves in association with said inlet and said outlet, preventing the displacement of liquid through said inlet and the drawing of liquid into said chamber through said outlet, a cage extending within said chamber toward said inlet, a diaphragm sealed to the edge of said cage and forming a movable wall for said chamber, a diaphragm plate on said diaphragm, a spring seated in said cage and maintaining said diaphragm plate in engagement with said diaphragm, the means for sealing said diaphragm to said chamber and cage comprising a retainer, a thermal element carried in said retainer on the outside of said chamber and having an extensible power member, a diaphragm plate abutting the outer side of said diaphragm, an over travel spring connecting said power member with said diaphragm plate for effecting movement of said diaphragm toward said chamber to displace liquid therefrom upon certain predetermined increases in temperature, and an electrically energizable heater for said thermal element energizable to heat the same for predetermined periods of time determined by the travel of said power member necessary to displace a predetermined volume of fluid from said chamber.

7. A liquid measuring and dispensing device comprising a measuring chamber, an inlet into said chamber, an outlet from said chamber, check valves in association with said inlet and said outlet, preventing the displacement of liquid through said inlet and the drawing of liquid into said chamber through said outlet, a cage extending within said chamber toward said inlet, a diaphragm sealed to the edge of said cage and forming a movable wall for said chamber, a diaphragm plate on said diaphragm, a spring seated in said cage and maintaining said diaphragm plate in engagement with said diaphragm, the means for sealing said diaphragm to said chamber and cage comprising a retainer, a thermal element carried in said retainer on the outside of said chamber and having an extensible power member, a diaphragm plate abutting the outer side of said diaphragm, an over travel spring connecting said power member with said diaphragm plate for effecting movement of said diaphragm toward said chamber to displace liquid therefrom upon certain predetermined increases in temperature, an electrically energizable heater for said thermal element energizable to heat the same for predetermined periods of time determined by the travel of said power member necessary to displace a predetermined volume of fluid from said chamber, and means for deenergizing said heater to accommodate cooling of said thermal element upon a predetermined travel of said power member comprising a switch completing an energizing circuit to said heater and a lost motion drive connection from said power member to said switch to effect opening thereof upon a predetermined travel of said power member.

8. In a measuring and dispensing device for liquids and the like, a measuring chamber, an inlet into said chamber, an outlet from said chamber, check valves in association with said inlet and said outlet, a piston within said chamber and movable therealong to vary the volume thereof, a heat motor having an extensible power member operatively connected with said piston for moving said piston along said chamber to displace a measured volume of liquid through said outlet, electrically energizable heating means for heating said heat motor, spring means within said chamber and operatively connected with said piston for retractibly moving said piston along said chamber to draw liquid within said chamber through said inlet, means for energizing said heating means including a switch, and means operable by extensible movement of said power member and movement of said piston along said chamber to displace liquid therefrom for opening said switch to deenergize said heating means upon the displacement of a measured volume of liquid from said chamber.

9. A liquid measuring and dispensing device comprising a container for liquid having a passage leading from the bottom thereof and having a measuring chamber on the downstream side of said passage in communication therewith, a piston within said measuring chamber and forming a movable wall therefor, an outlet from said chamber, check valve means for said passage and said outlet, a spring seated within said chamber and having operative engagement with said piston, a thermal element on the outside of said chamber having a power member extensible upon increases in temperature for moving said piston against said spring to displace a measured volume of liquid from said chamber, electrically energizable heating means for heating said thermal element to effect operation of said power member, and means for deenergizing said heating means in accordance with a predetermined travel of said power member and the displacement of a measured volume of liquid from said chamber, comprising a switch connected in the electrical energizing circuit for said heating means and a lost motion connection between said piston and said switch for opening the contacts of said switch to accommodate cooling of said thermal element.

10. In a liquid measuring and dispensing device for dispensing a predetermined volume of liquid during each dispensing operation, a measuring chamber having a movable portion operable to dispense liquid from said device, an inlet into said chamber, a check valve preventing the passage of liquid from said chamber through said inlet, an outlet from said chamber, a check valve preventing the passage of liquid from said outlet into said chamber, a heat motor operable to move the movable portion of said chamber to dispense liquid therefrom through said outlet, electrically energizable heating means for said heat motor, stop means for limiting movement of said movable portion to determine the volume of liquid dispensed, and spring means for returning said movable portion upon de-energization of said heating means to draw liquid into said chamber from said inlet.

11. In a liquid measuring and dispensing device for dispensing a predetermined volume of liquid during each dispensing operation, a measuring chamber having a movable portion operable to dispense liquid from said device, an inlet into said chamber, a check valve preventing the passage of liquid from said chamber through said inlet, an outlet from said chamber, a check valve preventing the passage of liquid from said outlet into said chamber, a heat motor operable to move the movable portion of said chamber to dispense liquid therefrom through said outlet, electrically energizable heating means for said heat motor, stop means for limiting movement of said movable portion to determine the volume of liquid dispensed, means for energizing said heating means including a switch, means operable by said heat motor for opening said switch to de-energize said heating means as said movable portion is stopped by said stop means, and spring means for returning said movable portion upon de-energization of said heating means to draw liquid into said chamber from said inlet.

12. In a liquid measuring and dispensing device for dispensing a predetermined volume of liquid during each dispensing operation, an expansible and collapsible measuring chamber, an inlet into said chamber, a check valve associated with said inlet permitting the passage of a predetermined volume of liquid through said inlet into said chamber upon expansion of said chamber but preventing the passage of liquid from said chamber through said inlet upon collapsing of said chamber, an outlet from said chamber, a check valve associated with said outlet permitting the passage of said predetermined volume of liquid from said chamber through said outlet upon collapsing of said chamber but preventing the passage of liquid from said outlet into said chamber upon expansion of said chamber, and means for collapsing said chamber to dispense said predetermined volume of liquid through said outlet, said means including a heat motor and electrically energizable heating means for operating said heat motor.

13. In a liquid measuring and dispensing device for dispensing a predetermined volume of liquid during each dispensing operation, an expansible and collapsible measuring chamber, an inlet into said chamber, a check valve associated with said inlet permitting the passage of a predetermined volume of liquid through said inlet into said chamber upon expansion of said chamber but preventing the passage of liquid from said chamber through said inlet upon collapsing of said chamber, an outlet from said chamber, a check valve associated with said outlet permitting the passage of said predetermined volume of liquid from said chamber through said outlet upon collapsing of said chamber but preventing the passage of liquid from said outlet into said chamber upon expansion of said chamber, spring means for expanding said chamber, and means for collapsing said chamber to dispense said predetermined volume of liquid through said outlet, said means including a heat motor and electrically energizable heating means for operating said heat motor.

References Cited in the file of this patent
UNITED STATES PATENTS

| Re. 18,425 | Hawxhurst | Apr. 12, 1932 |
| 2,166,484 | Carlson | July 18, 1939 |